(12) United States Patent
Pride et al.

(10) Patent No.: US 8,688,586 B2
(45) Date of Patent: *Apr. 1, 2014

(54) END-TO-END LICENSING OF DIGITAL MEDIA ASSETS

(75) Inventors: Edward Pride, Snohomish, WA (US); Vicki Daniel, Seattle, WA (US); Daniel Stephen Feduff, Issaquah, WA (US); Travis Gigliotti, Renton, WA (US)

(73) Assignee: Corbis Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,052

(22) Filed: Jun. 7, 2012

(65) Prior Publication Data

US 2012/0246734 A1    Sep. 27, 2012

Related U.S. Application Data

(63) Continuation of application No. 11/840,055, filed on Aug. 16, 2007.

(51) Int. Cl.
*G07G 1/12*    (2006.01)

(52) U.S. Cl.
USPC ............................................ 705/54; 705/57

(58) Field of Classification Search
USPC .......................................................... 705/57
See application file for complete search history.

(56) References Cited

U.S. PATENT DOCUMENTS

| | | | | |
|---|---|---|---|---|
| 5,629,980 A | * | 5/1997 | Stefik et al. ..................... 705/54 |
| 5,634,012 A | * | 5/1997 | Stefik et al. ..................... 705/39 |
| 5,721,826 A | * | 2/1998 | Gerson et al. .................. 709/213 |
| 5,809,145 A | * | 9/1998 | Slik et al. .......................... 705/52 |
| 5,822,436 A | * | 10/1998 | Rhoads ........................... 380/54 |
| 5,832,119 A | * | 11/1998 | Rhoads ......................... 382/232 |
| 5,835,899 A | * | 11/1998 | Rose et al. ...................... 705/34 |
| 5,841,886 A | * | 11/1998 | Rhoads ......................... 382/115 |
| 5,848,367 A | * | 12/1998 | Lotocky et al. ................. 701/36 |
| 5,854,591 A | * | 12/1998 | Atkinson ........................ 725/76 |
| 5,873,076 A | * | 2/1999 | Barr et al. ................... 704/270.1 |
| 5,884,280 A | * | 3/1999 | Yoshioka et al. ............ 705/26.1 |
| 5,892,900 A | * | 4/1999 | Ginter et al. .................... 726/26 |
| 5,905,981 A | * | 5/1999 | Lawler .......................... 715/201 |
| 5,910,987 A | * | 6/1999 | Ginter et al. .................... 705/52 |
| 5,915,019 A | * | 6/1999 | Ginter et al. .................... 705/54 |
| 5,917,912 A | * | 6/1999 | Ginter et al. .................. 713/187 |
| 5,918,215 A | * | 6/1999 | Yoshioka et al. ............... 705/30 |
| 5,920,861 A | * | 7/1999 | Hall et al. .............................. 1/1 |
| 5,937,395 A | * | 8/1999 | Iwamura ......................... 705/30 |
| 5,943,650 A | * | 8/1999 | Kanno .......................... 705/1.1 |
| 5,943,657 A | * | 8/1999 | Freestone et al. ............. 705/400 |
| 6,016,476 A | * | 1/2000 | Maes et al. ...................... 705/18 |

(Continued)

*Primary Examiner* — Evens J Augustin
(74) *Attorney, Agent, or Firm* — Soquel Group LLC

(57) ABSTRACT

Brokering use of media assets based on rights provided by rights holders and licensing terms requested by potential licensees. Rights include use attributes, geographic attributes, and time attributes. Use attributes include one or more parent categories of uses, such as print advertising, web promotion, etc. Each parent category includes one or more specific uses, such as magazine advertisement, newspaper advertisement, etc. Rights are obtained from rights holders and stored in a data structure that is searchable according to various rights attributes. A licensing request includes desired licensing terms, such as a specific use, time period, and geographic location. The licensing request may also reserve use for a later time and/or impose an embargo on use for a period after use. The data structure is searched for media assets whose rights encompass the desired licensing terms, such as media assets with a parent use that includes a desired specific use.

20 Claims, 7 Drawing Sheets

(56) References Cited

U.S. PATENT DOCUMENTS

| | | | | |
|---|---|---|---|---|
| 6,038,563 A | * | 3/2000 | Bapat et al. | 1/1 |
| 6,038,595 A | * | 3/2000 | Ortony | 709/218 |
| 6,044,349 A | * | 3/2000 | Tolopka et al. | 705/1.1 |
| 6,047,296 A | * | 4/2000 | Wilmott et al. | 715/210 |
| 6,052,717 A | * | 4/2000 | Reynolds et al. | 709/218 |
| 6,058,400 A | * | 5/2000 | Slaughter | 1/1 |
| 6,092,195 A | * | 7/2000 | Nguyen | 726/27 |
| 6,098,056 A | * | 8/2000 | Rusnak et al. | 705/75 |
| 6,108,644 A | * | 8/2000 | Goldschlag et al. | 705/69 |
| 6,119,234 A | * | 9/2000 | Aziz et al. | 726/11 |
| 6,122,403 A | * | 9/2000 | Rhoads | 382/233 |
| 6,122,625 A | * | 9/2000 | Rosen | 705/65 |
| 6,134,201 A | * | 10/2000 | Sako et al. | 369/47.19 |
| 6,134,661 A | * | 10/2000 | Topp | 726/18 |
| 6,170,002 B1 | * | 1/2001 | Ouchi | 709/206 |
| 6,182,120 B1 | * | 1/2001 | Beaulieu et al. | 709/207 |
| 6,189,139 B1 | * | 2/2001 | Ladd | 717/135 |
| 6,209,103 B1 | * | 3/2001 | Schreiber et al. | 726/26 |
| 6,215,745 B1 | * | 4/2001 | Sako et al. | 369/47.12 |
| 6,219,652 B1 | * | 4/2001 | Carter et al. | 705/59 |
| 2005/0108176 A1 | * | 5/2005 | Jarol et al. | 705/59 |
| 2006/0277106 A1 | * | 12/2006 | Wright | 705/14 |
| 2006/0277312 A1 | * | 12/2006 | Hirsch | 709/229 |
| 2006/0287916 A1 | * | 12/2006 | Starr et al. | 705/14 |
| 2007/0260671 A1 | * | 11/2007 | Harinstein et al. | 709/203 |

* cited by examiner

END-TO-END LICENSING OF DIGITAL MEDIA ASSETS

PRIORITY REFERENCE TO RELATED APPLICATIONS

This application is a continuation of U.S. patent application Ser. No. 11/840,055, entitled "End-To-End Licensing Of Digital Media Assets", filed on Aug. 16, 2007 by inventors Edward Pride, et al.

FIELD OF ART

The invention is directed to the brokering of rights in assets, and more particularly, to managing acquisition of rights from rights holders, identifying assets that satisfy desired licensing terms, and licensing assets to licensees.

BACKGROUND

Electronic images, audio, text, and other content are widely communicated over electronic networks, such as the Internet. An owner of such content, who wishes wide distribution and/or controlled distribution, may use an electronic distributor to host and distribute the content over a network to users who agree to license the content. Alternatively, the owner may use a rights clearing service to issue licenses over a network to users, while the owner or a separate service distributes the content to the licensees. Electronic distribution and clearance services typically act as neutral marketplaces where owners contribute content and potential licensees, search for and license content. Some neutral marketplaces may provide specialized security or searching capabilities, but generally do not determine rights associated with content, structure rights data for searching based on rights as well as content attributes, determine which rights satisfy licensing terms desired by potential licensees, divide compensation among all rights holders, or participate in other aspects of an overall process for managing content over its useful lifetime. Embodiments of the invention are directed to these and other aspects.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be implemented in different embodiments as methods, processes, processor readable mediums, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

Briefly, the subject invention relates to licensing media to customers on behalf of media owners. Aspects of the subject invention provide systems and methods for an end-to-end workflow that interfaces both with providers of media assets and with customer licensees, and manages legal, financial and fulfillment processing involved therewith. Legal processing includes inter alia contract negotiation and execution between an intermediary broker and the media providers, and between the broker and the customers. Financial processing includes inter alia accounts receivable for invoicing of customers for payment of licensing fees, accounts payable for payment of royalties to content providers and owners, and audit reports. Fulfillment processing includes inter alia delivery of media and related merchandise, as appropriate for customers.

Illustrative Operating Environment

Figure 1:
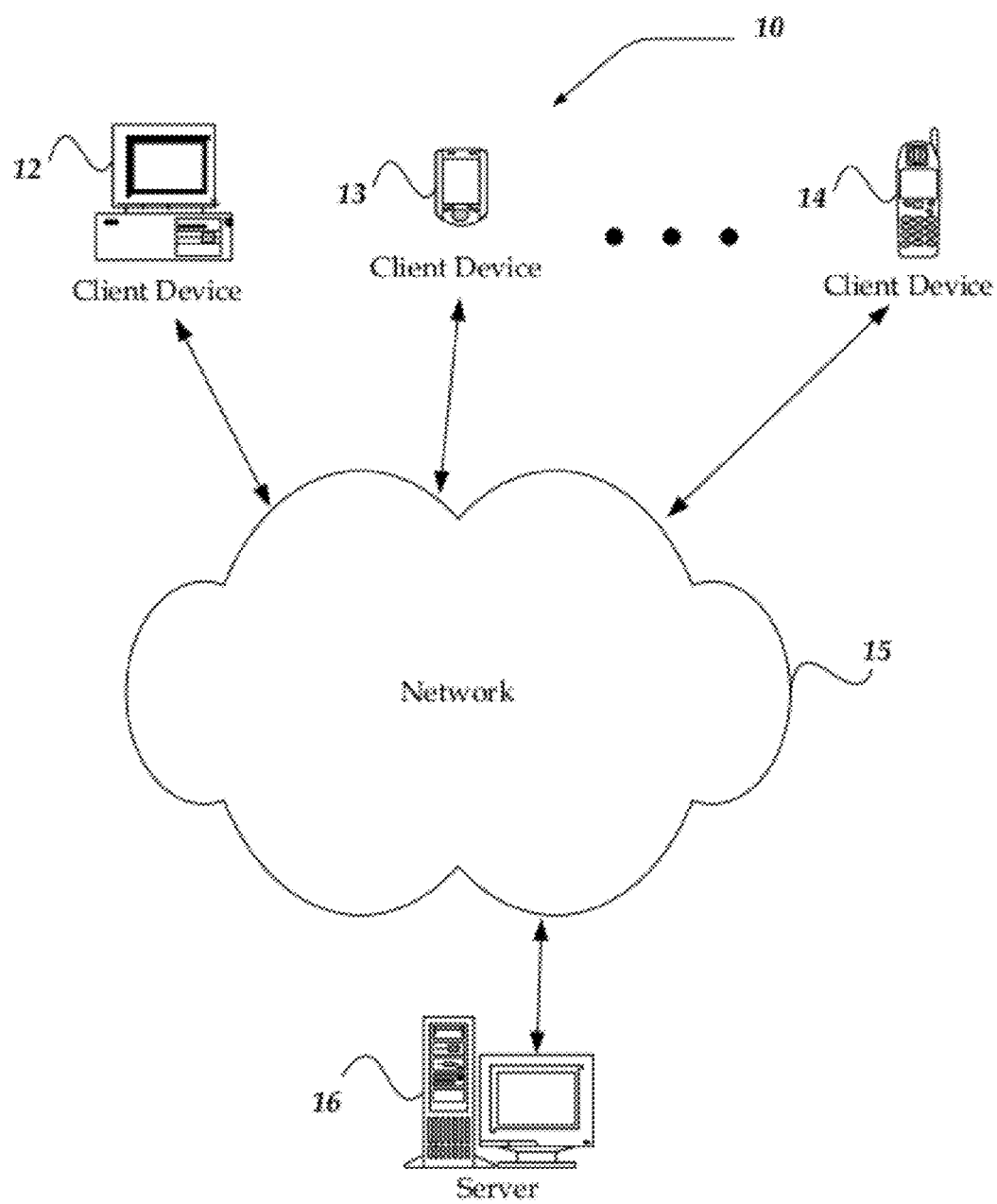
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and a server 16. Network 15 is in communication with and enables communication between each of client devices 12-14, and server 16.

Client devices 12-14 may include virtually any computing device capable of receiving and sending a message over a network, such as network 15, to and from another computing device, such as server 16, each other, and the like. The set of such devices may devices that are usually considered general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium. The client devices may be used by content providers, content distributors, content purchasers, system administrators, and the like.

Each client device within client devices 12-14 includes a user interface that enables a user to control settings, and to instruct the client device to perform operations. Each client device also includes a communication interface that enables the client device to send and receive messages from another computing device employing the same or a different communication mode, including, but not limited to email, SMS, MMS, IM, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

One embodiment of a general purpose computing device, such as a computing device 20, is described in more detail below in conjunction with FIG. 2. Computing device 20 may be used as a server device and/or a client device. Briefly, computing device 20 may include any computing device capable of connecting to network 15 to enable a user to communicate with other client devices and/or server 16. Computing device 20 may include many more components than those shown. The components shown, however, are sufficient to disclose an illustrative embodiment for practicing the invention.

As shown in the figure, computing device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of computing device 20. The mass memory also stores an operating system 31 for controlling the operation of computing device 20. It will be appreciated that this component may include a general purpose operating system such as a version of Windows™, UNIX or LINUX™. The operating system may also include, or interface with a Java virtual machine module that enables control of hardware components and/or operating system operations via Java application programs.

Mass memory 24 further includes one or more data storage units 32, which can be utilized by computing device 20 to store, among other things, programs 34 and/or other data. Programs 34 may include computer executable instructions which can be executed by computing device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

Depending on the particular use of computing device 20, mass memory 24 stores a rights and license management module 36. Rights and license management module 36 may include computer executable instructions, which may be run under control of operating system 31 to process acquisition of asset rights, licensing of assets, and/or other client and/or server aspects of asset rights management.

Figure 2:
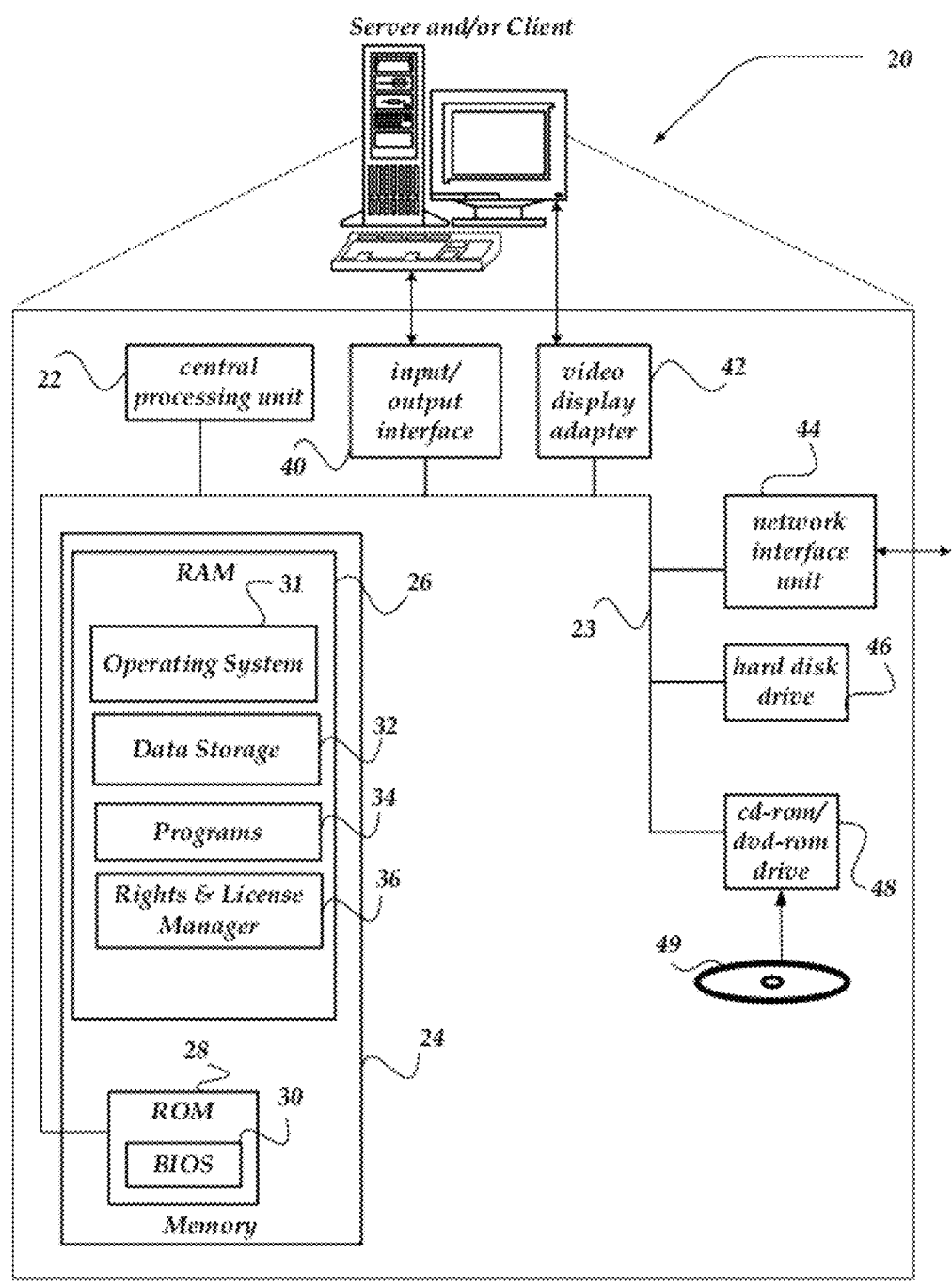
FIG. 2 shows one embodiment of a server and/or client device that may be included in a system implementing the invention.

Computing device 20 also includes an input/output interface 40 for communicating with input/output devices such as a keyboard, mouse, wheel, joy stick, rocker switches, keypad, printer, scanner, and/or other input devices not specifically shown in FIG. 2. A user of computing device 20 can use input/output devices to interact with a user interface that may be separate or integrated with operating system 31 and/or programs 34. Interaction with the user interface includes visual interaction via a display, and a video display adapter 42.

Computing device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, computing device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Illustrative Architecture & Processing

Figure 3:
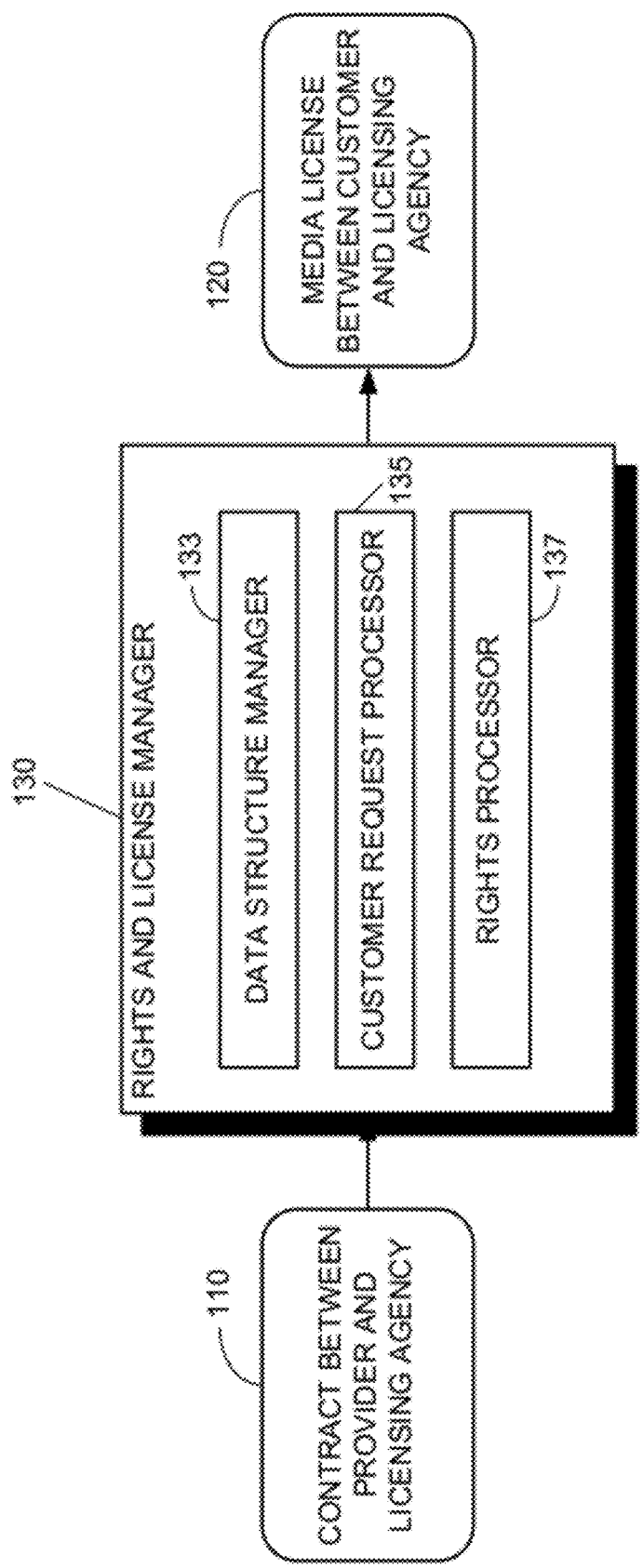
FIG. 3 is a simplified diagram of an end-to-end brokering system that negotiates contracts for in-bound rights from media providers, and licenses the media as out-bound rights to customers, in accordance with an embodiment of the subject invention.

Reference is now made to FIG. 3, which is a simplified diagram of an end-to-end brokering system that negotiates contracts for in-bound rights 110 from media providers, and licenses the media as out-bound rights 120 to customers, in accordance with an embodiment of the subject invention. An automated rights and license manager 130 acts as the in-between broker, as described herein below. In-bound rights may include one or more restrictions as imposed by the provider. Out-bound rights may be exclusive or non-exclusive, and are generally limited in permitted usages, both because of restrictions imposed by providers, and because of licensing fees that customers are willing to pay.

Figure 4:
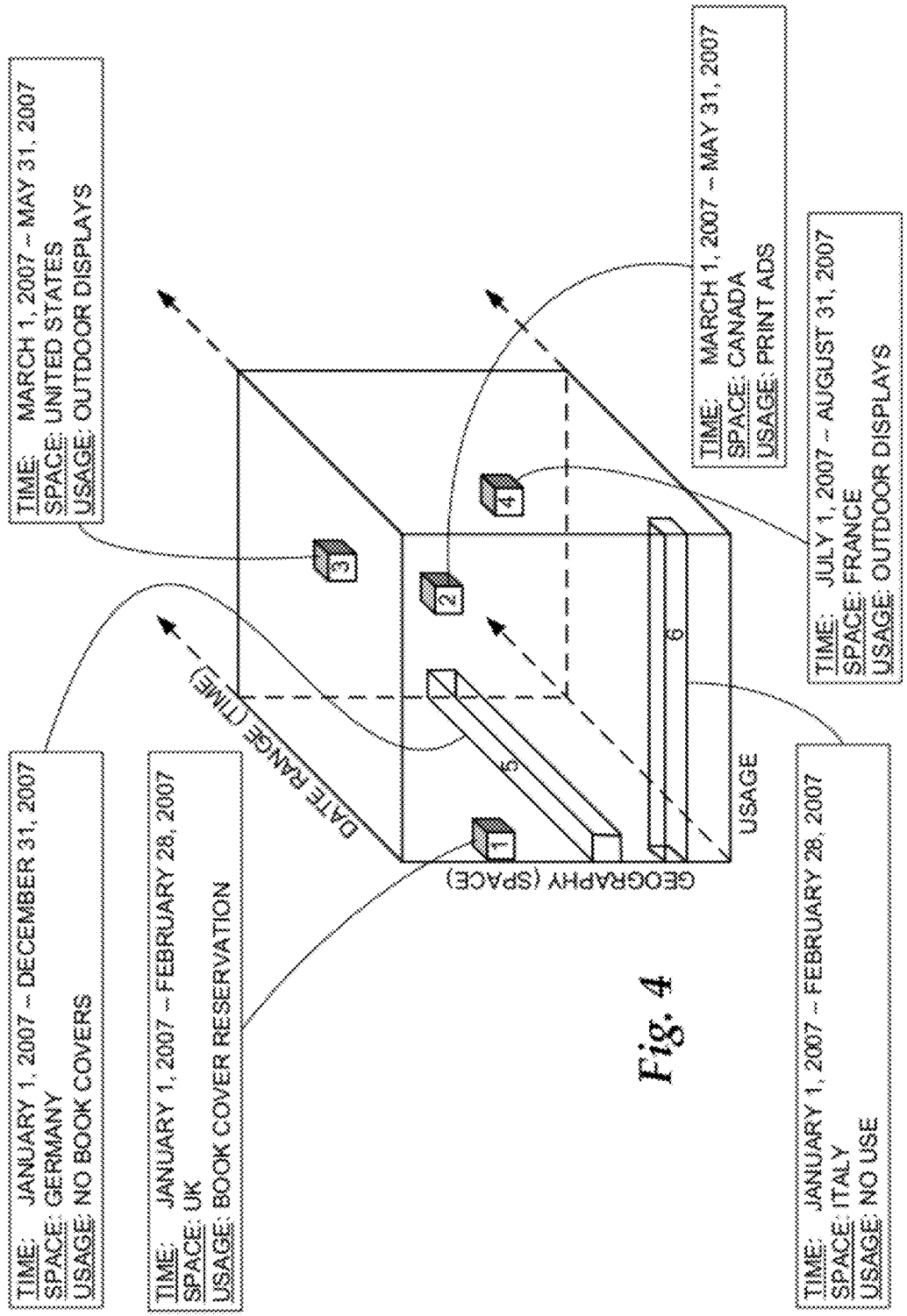
FIG. 4 is an illustration of a three-dimensional time-space-usage cube for visualizing licensable rights for a media asset, in accordance with an embodiment of the subject invention.

Rights and license manager 130 includes a data structure manager 133, a customer request processor 135, and a rights processor 137. Data structure manager 133 receives inbound rights and maintains a data structure corresponding to an inventory of associated out-bound rights that are available for each media asset. In one embodiment of the subject invention, data structure manager 133 maintains a three-dimensional data structure corresponding to the rights model described herein below, as illustrated in FIG. 4.

Customer request processor 135 receives a customer licensing request as input and produces a re-formatted request as output, the re-formatted request conforming to the data structure maintained by data structure manager 133. In one embodiment, customer request processor 135 re-formats the customer request to include (i) a requested time period, (ii) a requested geographical region, and (iii) one or more requested use codes. Use codes are described herein below with respect to the rights model.

Rights processor 137 receives the re-formatted customer request as input and, based on current data within the data structure maintained by data structure manager 133, decides whether or not the customer request can be satisfied; i.e., whether or not the requested license rights are available for granting.

An example embodiment of the subject invention includes two foundational aspects; namely, a rights model and a plurality of licensing processes. The rights model is used to manage an inventory of content rights, and the licensing processes are used for acquiring and licensing rights. Media content rights are effectively the commercial assets of an agency using the subject invention.

Rights Model

In accordance with an embodiment of the present invention, usage rights are represented and codified in terms of a "parent use category" and a "specific use" within the parent use category. Generally, parent use categories are included or excluded as part of in-bound rights, and specific uses are included or excluded as part of out-bound rights. Such categorization reflects that content rights are generally acquired from content providers in bulk and disposed of granularly to licensees.

TABLE I includes some examples of parent use category/specific use rights.

TABLE I

Examples of usage rights

| Parent Use Category | Specific Use |
| --- | --- |
| Print advertising | Print ad - directory |
| Print advertising | Print ad - magazine |
| Print advertising | Print ad - newspaper |
| Web advertising | Web ad - web site promotion |
| Web advertising | Web ad - e-mail |

In terms of codes, rights are classified as N.m, where N is a parent use category code, such as "print advertising", and m is a specific use code, such as "print ad—magazine". The totality of parent use category codes, N, forms a partition of all licensable usages; and within each parent use category, the totality of specific use codes, m, forms a partition of all licensable usages within the parent use category. In general, the rights brokerage is characteristic of bulk acquisition and granular disposition. Inbound rights are generally bulk in nature, and are partitioned into N total codes. Outbound rights are generally granular in nature, and each inbound right is partitioned into specific use codes. If the inbound rights are enumerated as 1, 2, . . . , N, then the total number of inbound rights is N. The total number of outbound rights is m1+ m2+ . . . +mN, where mi is the number of specific use codes for inbound right i. The totality of rights is represented in a single axis of the cube in FIG. 4; namely, the usage axis In addition to usage limitations, in-bound and out-bound rights are generally limited by a term and by a territory. In this regard, reference is now made to FIG. 4, which is an illustration of a three-dimensional time-space-usage cube for visualizing licensable rights for a media asset, in accordance with an embodiment of the present invention. Licensable rights are envisioned as spanning three axes, including (i) a time axis for temporal restrictions that define the term of the rights, (ii) a spatial axis for spatial restrictions that define the territory of the rights, and (iii) a usage axis for specific uses that are allowed. The totality of all rights for the media asset is represented as the cube in FIG. 4, and each of the configurations designated 1-6 in the cube represent an example of a specific set of rights.

Configuration 1 represents an exclusive right to use the media asset for book covers (usage) in the UK (space) for the period Jan. 1, 2007-Feb. 27, 2007 (time). Opaque configurations 2-4 represent exclusive rights similar to those of Configuration 1. Transparent configurations 5 and 6 represent exclusions, generally corresponding to restrictions imposed by a provider of the media asset. Configuration 5 restricts the media asset from being used for book covers (usage) in Germany (space) for the entire period Jan. 1, 2007-Dec. 31, 2007 (time). Configuration 6 restricts the media asset from being used in Italy (space) for any use (usage) during the time period Jan. 1, 2007-Feb. 28, 2007. The six configurations shown in FIG. 4 are summarized in TABLE IIA.

TABLE IIA

Summary of rights elements in FIG. 4

| Configuration | Time | Space | Usage |
|---|---|---|---|
| 1 | Jan. 01, 2007-Feb. 28, 2007 | UK | Book covers |
| 2 | Mar. 01, 2007-May 31, 2007 | Canada | Print ads |
| 3 | Mar. 01, 2007-May 31, 2007 | USA | Outdoor displays |
| 4 | Jul. 01, 2007-Aug. 31, 2007 | France | Outdoor displays |
| 5 | Jan. 01, 2007-Dec. 31, 2007 | Germany | No book covers |
| 6 | Jan. 01, 2007-Feb. 28, 2007 | Italy | No use |

It will be appreciated by those skilled in the art that any configuration of rights may be represented and codified by a time range, a territory, and a combination of one or more usage codes N.m as described hereinabove.

Rights restrictions originate from many different sources. In one embodiment there are at least three levels of inbound restrictions, as follows.

Contract level restrictions: relating to a specific contract and imposed by content owners, such as a photographer or agency;

Session level restrictions: relating to a group of content items, such as a set of images from a photo shoot, like a set of images from a specific event; and Content level restrictions: relating to a specific content item, such as a specific image or content, like a celebrity.

Rights restrictions are generally in the form of usage limitations, which could forbid use in certain instances (e.g., adult magazines). Rights restrictions generally fit into the rights model as carve-outs of the cube in FIG. 4.

There are many types of restrictions that result from licensing of rights, including inter alia the follows.

Exclusivity restrictions: content licensed exclusively cannot be further licensed under the same rights;

Reservations: licensed content is put on hold for a period of time, during which it cannot be further licensed; for example, advance reservations may be placed on content which has not been released yet; and Embargos: licensed content is put on hold for a period of time during which it cannot appear; for example, a magazine may require a six-month embargo from the time a photo appears in the magazine, during which time the photo cannot appear elsewhere. The photo can be licensed during the embargo period, but cannot appear in print or on the web.

Referring back to TABLE IIA, configurations 1-6, shown in FIG. 4, originate from the restrictions listed in TABLE IIB.

TABLE IIB

Summary of restrictions in FIG. 4

| Configuration | Type of Restriction |
|---|---|
| 1 | Outbound image reservation |
| 2 | Outbound exclusive license |
| 3 | Outbound non-exclusive license |
| 4 | Outbound non-exclusive license |
| 5 | Inbound rights restriction |
| 6 | Inbound embargo |

The unfilled volume in the cube of FIG. 4 represents rights that are still available for licensing. An embodiment of the present invention includes a real-time engine to check availability of rights. The real-time engine uses a set of rules, based on the three axes in FIG. 4, to determine if a specified rights configuration, such as any of the configurations in TABLE IIA, is available for licensing. Example rules are as follows.

Rule I (Usage): If a parent use is not available from the in-bound rights, then the specified configuration is not licensable.

Rule II (Space): If the geography is not available from the in-bound rights, then the specified configuration is not licensable.

Rule III (Time): If there is an exclusive license blocking either the parent use or the geography, then the specified configuration is not licensable until exclusivity expires.

Licensing Processes

Figure 5:
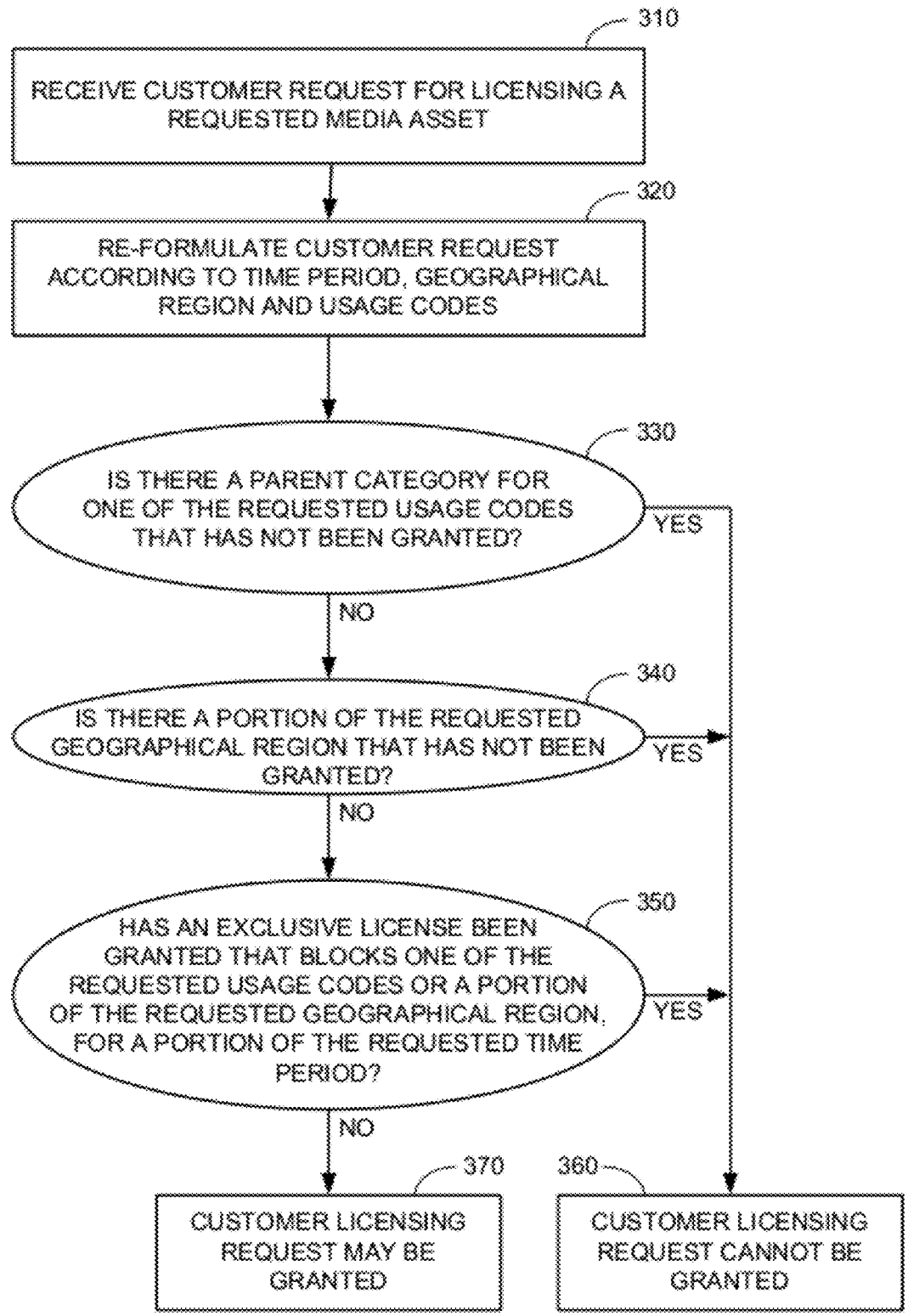
FIG. 5 is a simplified flowchart of a method for end-to-end media licensing, in accordance with an embodiment of the subject invention.

In this regard, reference is now made to FIG. 5, which is a simplified flowchart of a method for end-to-end media licensing, in accordance with an embodiment of the subject invention. At step 310, a customer licensing request for a media asset is received. The licensing request generally includes desired license terms, such as a desired use, a desired geographic location, a desired time period, and/or other attributes similar to those of content owner rights. The license request may also include content terms, such as a subject matter of the content, a type of media, a media identifier, or the like. At step 320 the customer request is re-formatted according to a data structure used to maintain an inventory of available rights for media assets. For the rights model embodiment described hereinabove, the re-formatted request includes a time period, a geographical region and one or more usage codes of the form N.m. A request may be submitted through a web form or other communication method. Data submitted through fields on the form may be parsed for information that is categorized into the time, geography, and usage parameters illustrated by the axes of FIG. 4.

At step 330 a determination is made whether there is a parent category, N, for one of the requested usage codes, N.m, for which rights have not been granted by the rights owner for the requested media asset. If rights have not been granted by a rights owner for a patent category, N, then at step 360 a notification is output that the customer request cannot be granted. Otherwise, at step 340, a further determination is made whether there is a portion of the requested geographic region for which rights have not been granted by a rights owner for the requested media asset. If rights have not been granted by a rights owner for a geographic region, then at step 360 a notification is output that the customer request cannot be granted. Otherwise, at step 350 yet a further determination is made whether an exclusive license to the requested media asset has been granted for a portion of the requested time period, which blocks one of the requested usage codes N.m, or which blocks a portion of the requested geographic region. If a blocking exclusive license exists, then at step 360 a notification is output that the customer request cannot be granted. Otherwise, at step 370 a notification is output that the customer request may be granted, such that the customer may access the media asset. The customer may be provided with an electronic copy of the media asset or may be provided with an authorization code to access the media asset at a remote storage location.

In addition to the usage, space and time attributes described hereinabove, which are used to manage an inventory of rights as illustrated in FIG. 4, licensable rights include other attributes as well. TABLE III presents a detailed meta-data schema for variables used in an embodiment of the present invention to describe a variety of rights associated with media assets.

TABLE III

Meta-data schema for rights

| Attribute | Description |
|---|---|
| Parent use | A broad category such as "print advertising" |
| Geography | A geographical territory |
| Specific use | A narrow category such as "printed magazine ads" |
| Time duration | A time period |
| Language | A specific language |
| Image size | A pixel size such as 320 × 240, or a physical print size 2" × 4" |
| Circulation/Print run | A number of copies to be distributed |
| Placement | A position, such as "top of front page" |
| Industry | A type of industry, such as automotive |
| File size | A size in megabytes |
| License/price model | A model to be used for licensing and pricing |
| Legacy terms | Use restrictions from legacy |
| Magazine | Name or type of magazine |
| Publicist | Name of publicist |
| Non-standard industry list | A usage restriction in the form of a list of non-standard industries |
| Image manipulation | Permission to modify image? |
| Price discounting | Permitted discount |

In addition to meta-data used for describing attributes of rights, meta-data is also used for describing attributes of content. TABLE IV presents a detailed meta-data schema for variables used in an embodiment of the present invention to describe media content.

TABLE IV

Meta-data schema for media content

| Attribute | Description |
|---|---|
| Collection | A group of content to which a specific piece of content belongs |
| Album | An album to which a piece of content belongs |
| Feature Sets | Additional features that are included in a piece of content |
| CD Collection | A CD collection to which a piece of content belongs |
| Available for subscription download | Whether or not a piece of content is available for download via a subscription |
| Right of first sale | Whether or not a piece of content is available for first sale |
| Available for exclusive license | Whether or not a piece of content is available for exclusive license |
| Agent represents exclusive rights | Whether the agent for a piece of content has exclusive rights |
| Agent owns copyright | Whether the agent for a piece of content owns the copyright thereto |
| Agent can use for self-promotion | Whether the agent for a piece of content has the right to use the content for self-promotion |
| Geography access | Territories that are permitted to access a piece of content |
| Available for high-resolution comp. | Whether or not a piece of content is available for high-resolution composition |
| Content type | Type of content, such as song, photo or movie |
| Embargo date | Embargo date for a piece of content that is on hold |
| Removal | Remove the media from license sales inventory and appropriate sales channels |
| Pre-approval required | Whether or not pre-approval is required before a piece of content may be used |
| Rights clearance required | Whether or not rights clearance is required before a piece of content may be used |
| Distribution/site | Sales distribution channels through which the media can be licensed |
| Session | A photo or recording session from which a piece of content was created |
| Fine art copyright status | Whether or not a piece of content has fine art copyrights |

Figure 6A:
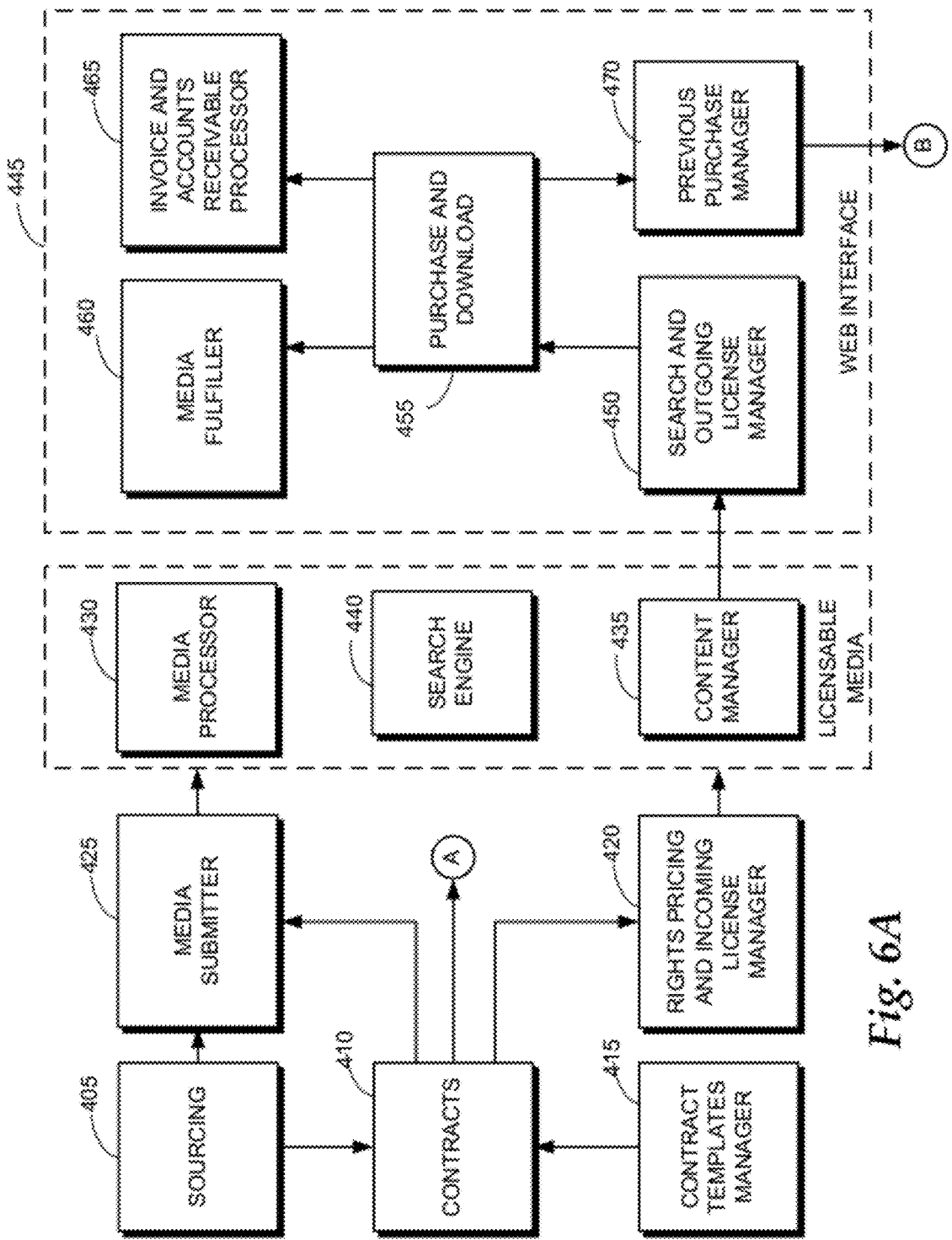
FIG. 6A is a simplified block diagram of a content processing portion of an example enterprise resource planning (ERP) system that implements an automated end-to-end media asset licensing broker, in accordance with an embodiment of the subject invention.
Figure 6B:
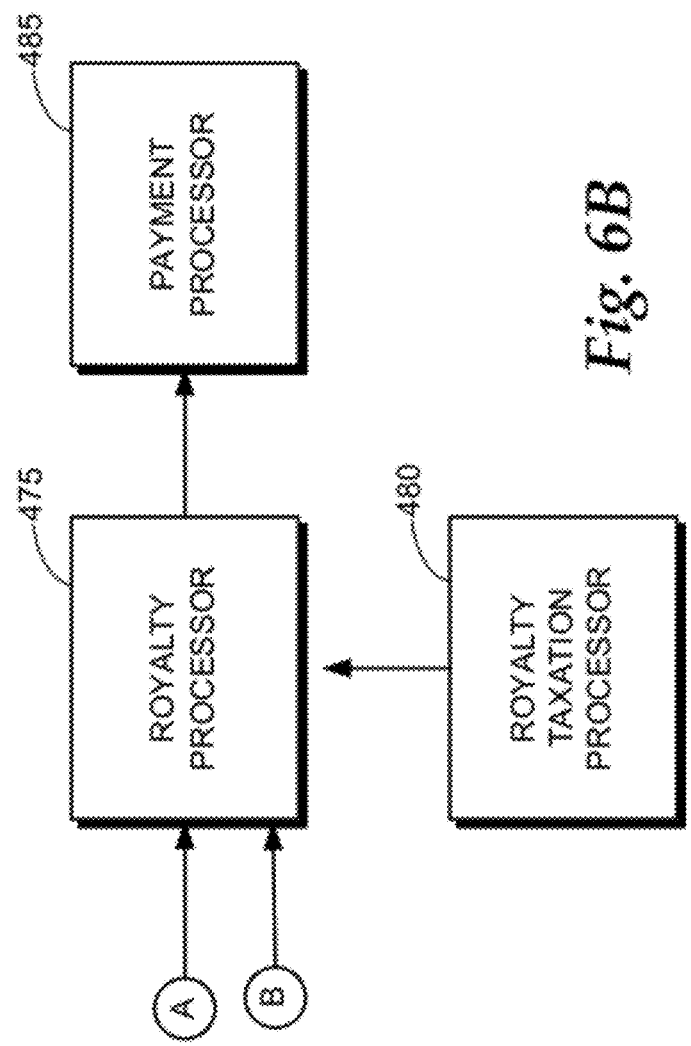
FIG. 6B is a simplified block diagram of a payment processing portion of the example ERP system that implements an automated end-to-end media asset licensing broker, in accordance with an embodiment of the subject invention.

Reference is now made to FIGS. 6A and 6B which together illustrate a simplified block diagram of an example ERP system that implements an automated end-to-end media asset licensing broker, in accordance with an embodiment of the subject invention. Shown in FIG. 6A is a sourcing unit 405, for interfacing with a provider who has rights to license one or more media assets.

The subject embodiment configures flexible content provider contracts in real-time. The contracts incorporate restrictions imposed by one or more content owners, and limitations imposed by third parties or by a licensing agency. To this end, a contracts module 410 enables the provider to define a set of rights to be licensed, and generates an appropriate contract between the provider and the licensing broker. Contracts module 410 uses a contract templates manager 415 to generate various terms and conditions of the contract, based on the provider-defined rights to be licensed.

After a contract is executed (electronically or manually) by the provider and the licensing broker, the contract is (automatically or manually) entered into a rights pricing and incoming license manager 420. The rights pricing and incoming license manager performs some of the data structure management and rights processing of rights and license manager 130 shown in FIG. 3. A media submitter 425 enables the provider to upload his media assets to the automated licensing broker.

The media assets uploaded by the provider are analyzed, cataloged, indexed to search terms, stored, and otherwise processed by a media processor 430 and managed by a content manager 435, which makes the provider's media available through one or more channels. A search engine 440 enables potential licensees to search through the media assets and find those assets appropriate for their desired projects.

Web interface 445 is a customer-facing interface for discovering media assets and conducting licensing transactions. A search and outgoing license manager 450 processes queries to, and responses from search engine 440. The search and outgoing license manager performs some of the customer request processing and rights processing of rights and license manager 130 shown in FIG. 3. A purchase and download module 455 enables the customer to purchase a license to one or more media assets, and download electronic versions thereof. A media fulfiller module 460 is used to provide non-electronic versions of media to a customer, including varieties of media-based merchandise. An invoice and accounts receivable processor 465 prepares a customer invoice and forwards it to accounts receivable.

A previous purchase manager 470 maintains histories of previous licenses and purchases, including licenses that are currently in force and licenses that have expired. Previous purchase manager 470 includes information used to determine availability of a media asset, in accordance with the rights available, such as the space-time-usage rights model illustrated in FIG. 4.

As shown in FIG. 6B, a royalty processor 475 derives the royalty payable to the provider of the media assets licensed by customers, based on the invoice generated by accounts receivable processor 465 and the contract generated by contracts module 410. Royalty processor 475 also uses a taxation processor 480 to determine the amount of income tax to deduct from a gross royalty payment. A payment processor 485 issues a net royalty payment to the provider.

In reading the above description, persons skilled in the art will realize that there are many apparent variations that can be applied to the methods and systems described. Thus it may be appreciated that the present invention is advantageous for use with general brokerage systems and services that require rights clearances, in addition to media asset licensing, including inter alia brokering of legal contracts, brokering of real estate rentals and sales, brokering of sales and marketing services, and the like.

What is claimed as new and desired to be protected by Letters Patent is:

1. A computer-implemented method for licensing media assets, comprising:
   receiving from a rights holder, by a computer server, an inbound right to license a media asset, wherein an inbound right is defined at least in part by at least one parent use category, wherein a parent use category includes one or more specific uses for which a media asset may be licensed;
   storing, by the computer server, a data structure that represents the inbound right;
   receiving, by the computer server, a request to license the media asset, wherein the request includes a desired outbound right, wherein the desired outbound right is defined at least in part by a desired specific use for the media asset;
   determining, by the computer server, whether the desired outbound right is within the received inbound right; and
   providing, by the computer server, a license to use the media asset according to the desired outbound right, if the desired outbound right is within the inbound right.

2. The method of claim 1, wherein the inbound right further is further defined by at least one of the following:
   a geographic attribute that defines geographic locations for which the media asset may be licensed; and
   a time attribute that defines a time period during which the media asset may be licensed; and
   wherein said outbound right is further defined at least in part by at least one of the following:
   a desired geographic location in which the license applies; and
   a desired time period during which the license applies.

3. The method of claim 1, wherein the at least one parent use category includes at least one of the following: print advertising or web advertising.

4. The method of claim 3, wherein (1) specific uses for the parent use category print advertising comprise at least one of a printed directory advertisement, a printed magazine advertisement, or a printed newspaper advertisement, and (2) specific uses for the parent use category web advertising comprise at least one of a web advertisement, or a web email advertisement.

5. The method of claim 2, wherein the inbound right includes at least one of the following:
   an excluded specific use that identifies a specific use for which the media asset may not be licensed;
   an excluded geographic location that identifies a geographic location for which the media asset may not be licensed; and
   an excluded time period that specifies a time period for which the media asset may not be licensed.

6. The method of claim 1, wherein the desired outbound right includes at least one of the following:
   an exclusivity restriction that prevents the media asset from being further licensed for the desired use during the desired time period; and
   an embargo period that specifies a period of time after the termination of the desired time period during which the media asset may not be licensed for use for one or more specified specific uses or for one or more specified parent use categories.

7. The method of claim 1, wherein said determining comprises determining whether the at least one parent use category includes the desired specific use.

8. The method of claim 2, wherein said determining comprises determining whether the geographic attribute includes the desired geographic location.

9. The method of claim 2, wherein said determining comprises determining whether the time attribute includes the desired time period.

10. The method of claim 1, further comprising providing access to the media asset, wherein providing access comprises at least one of the following: providing an electronic copy of the media asset and providing an authorization for access to the media asset at a remote storage.

11. The method of claim 1, wherein the media asset comprises at least one of the following: an image, a video clip, and an audio clip.

12. The method of claim 1, further comprising determining a royalty for the rights holder if the desired outbound right is determined to be within the inbound right.

13. A server computer, comprising:
   a processor;
   a communication interface in communication with the processor;
   a data storage for storing data structures that represent inbound rights associated with media assets, wherein an inbound right is defined at least in part by at least one parent use category, wherein a parent use category includes one or more specific uses for which a media asset may be licensed; and
   a memory in communication with the processor for storing instructions, which when executed by the processor, cause the server:
      to receive from a rights holder an inbound right to license a media asset;
      to store in the data storage a data structure that represents the inbound right;
      to receive a request to license the media asset, wherein the request includes a desired outbound right, wherein the desired outbound right is defined at least in part by a desired specific use for the media asset;
      to determine whether the desired outbound right is within the received inbound right; and to provide a license to use the media asset according to the desired outbound right, if the desired outbound right is within the inbound right.

14. The server computer of claim 13, wherein the inbound right further is further defined by at least one of the following:
a geographic attribute that defines geographic locations for which the media asset may be licensed; and
a time attribute that defines a time period during which the media asset may be licensed; and
wherein said outbound right is further defined at least in part by at least one of the following:
a desired geographic location in which the license applies; and
a desired time period during which the license applies.

15. The server computer of claim 13, wherein the at least one parent use category includes at least one of the following: print advertising or web advertising.

16. The server computer of claim 13, wherein (1) specific uses for the parent use category print advertising comprise at least one of a printed directory advertisement, a printed magazine advertisement, or a printed newspaper advertisement, and (2) specific uses for the parent use category web advertising comprise at least one of a web advertisement, or a web email advertisement.

17. The server computer of claim 14, wherein the inbound right includes at least one of the following:
an excluded specific use that identifies a specific use for which the media asset may not be licensed;
an excluded geographic location that identifies a geographic location for which the media asset may not be licensed; and
an excluded time period that specifies a time period for which the media asset may not be licensed.

18. The server computer of claim 13, wherein said determining comprises determining whether the at least one parent use category includes the desired specific use.

19. The server computer of claim 14, wherein said determining comprises determining whether the geographic attribute includes the desired geographic location.

20. The server computer of claim 14, wherein said determining comprises determining whether the time attribute includes the desired time period.

* * * * *